US012623320B2

(12) United States Patent
Liu

(10) Patent No.: US 12,623,320 B2
(45) Date of Patent: May 12, 2026

(54) HAND TOOL HOLDER

(71) Applicant: NINGBO KING MOUNT CO., LTD., Ningbo (CN)

(72) Inventor: Kuan-Ting Liu, Taichung (TW)

(73) Assignee: NINGBO KING MOUNT CO., LTD., Ningbo (CN)

( * ) Notice: Subject to any disclaimer, the term of this patent is extended or adjusted under 35 U.S.C. 154(b) by 302 days.

(21) Appl. No.: 18/586,321

(22) Filed: Feb. 23, 2024

(65) Prior Publication Data

US 2025/0269503 A1 Aug. 28, 2025

(51) Int. Cl.

| | |
|---|---|
| ***B25B 15/00*** | (2006.01) |
| ***B25B 23/00*** | (2006.01) |
| ***B25F 1/04*** | (2006.01) |
| ***B25G 1/08*** | (2006.01) |
| ***B25H 3/00*** | (2006.01) |
| *B25H 3/04* | (2006.01) |

(52) U.S. Cl.

CPC ........ *B25B 23/0035* (2013.01); *B25B 15/008* (2013.01); *B25F 1/04* (2013.01); *B25G 1/085* (2013.01); *B25H 3/003* (2013.01); *B25H 3/04* (2013.01)

(58) Field of Classification Search

CPC . B25F 1/04; B25F 1/00; B25B 15/008; B25B 13/56; B25B 7/168; B25B 7/138; B25B 27/0071; B25H 3/003; B25H 3/04; B25G 1/085

USPC .................. D8/105; 81/177.4, 440; 206/377

See application file for complete search history.

(56) References Cited

U.S. PATENT DOCUMENTS

| | | | | |
|---|---|---|---|---|
| 3,943,801 A * | 3/1976 | Yates | B25B 13/56 81/440 |
| 4,681,234 A * | 7/1987 | Wisnieswski | B25H 3/003 211/60.1 |
| 8,387,492 B2 | 3/2013 | Liu | |
| 2007/0186731 A1* | 8/2007 | Schnarr | B25H 3/003 81/177.4 |
| 2011/0289693 A1* | 12/2011 | Tsai | B25F 1/04 7/118 |
| 2015/0158154 A1* | 6/2015 | Chen | B25F 1/00 206/377 |
| 2017/0120434 A1* | 5/2017 | Tsai | B25F 1/04 |
| 2018/0147701 A1* | 5/2018 | Liu | B25F 1/04 |
| 2020/0061784 A1* | 2/2020 | Hermansen | B25F 1/04 |
| 2024/0208038 A1* | 6/2024 | Liu | B25H 3/003 |

FOREIGN PATENT DOCUMENTS

| | | | |
|---|---|---|---|
| DE | 29821725 U1 * | 5/1999 | B25B 15/008 |
| WO | WO-0124976 A1 * | 4/2001 | B25H 3/003 |

* cited by examiner

*Primary Examiner* — Mahdi H Nejad
(74) *Attorney, Agent, or Firm* — Justin Lampel

(57) ABSTRACT

A hand tool holder includes a holder body including a first face, a second face, a third face, and a fourth face. The holder body is provided with at least one first groove arranged on the second face and the third face. The at least one first groove includes a first recessed portion, a first connecting portion, and a first mounting portion which are connected to construct an L-shaped channel. The holder body is provided with at least one second mounting portion connected to the first connecting portion. The holder body is provided with a fifth face. The at least one second mounting portion has an opening connected to the fifth face. The first recessed portion has an opening connected to the fifth face.

8 Claims, 14 Drawing Sheets

HAND TOOL HOLDER

BACKGROUND OF THE INVENTION

Field of the Invention

The present invention relates to a holder (or rack) and, more particularly, to a hand tool holder.

Description of the Related Art

A conventional hand tool set combination was disclosed in the U.S. Pat. No. 8,387,492, and comprises a grip body, two support members, and multiple tool parts. The grip body includes two side covers. Each of the side covers has a storage space. Each of the side covers has an end provided with a pivot portion. Each of the side covers has a face provided with an elongate slot. The support members are received in the side covers. Each of the support members has a pivot shaft pivotally connected with the pivot portion of each of the side covers. Each of the tool parts has a pivot end pivotally connected with the pivot shaft of each of the support members. Each of the tool parts has a distal end formed with a tool end. An extension rod is formed between the pivot end and the tool end and extends through the elongate slot of each of the side covers.

In operation, by the quick release structure of the two side covers and the rotational pivoting of the tool parts, the tool end of each of the tool parts extends outward from the elongate slot of each of the side covers to be operated by the user. Alternatively, each of the tool parts is received and stored in the storage space of each of the side covers.

However, such a conventional hand tool set combination has the following disadvantages.

1. The pivot end of each of the tool parts is pivotally connected with the pivot shaft of each of the support members, so that the extension rod of each of the tool parts extends through the elongate slot of each of the side covers through 90 degrees or 180 degrees only. Thus, the assembly position of each of the tool parts is limited by each of the support members, and the movement of each of the tool parts is restricted, so that each of the tool parts can only be rotated through a determined angle.
2. The grip body is only pivotally connected with the tool parts and cannot be assembled with other tool parts, thereby limiting the versatility of the grip body.
3. The pivot end of each of the tool parts is pivotally connected with the pivot shaft of each of the support members, so that each of the tool parts cannot be detached from the grip body, thereby limiting the mobility of each of the tool parts.
4. Each of the tool parts is pivotally mounted on the pivot shaft of each of the support members, and each of the tool parts is rotated outward from the elongate slot of each of the side covers to be operated by the user, so that the axis of each of the tool parts is easily rotated and shifted during operation. Thus, each of the tool parts will be able to rotate back automatically, thereby causing inconvenience to the user during operation.

BRIEF SUMMARY OF THE INVENTION

In accordance with the present invention, there is provided a hand tool holder comprising a holder body. The holder body includes a first face, a second face, a third face, and a fourth face. The holder body is provided with at least one first groove arranged on the second face and the third face. The at least one first groove has an L-shaped profile. The at least one first groove includes a first recessed portion, a first connecting portion, and a first mounting portion. The first recessed portion, the first connecting portion, and the first mounting portion are connected and construct an L-shaped channel. The holder body is provided with at least one second mounting portion located beside the at least one first groove. The at least one second mounting portion and the first recessed portion extend in the same direction. The at least one second mounting portion is connected to the first connecting portion. The holder body is provided with a fifth face. The at least one second mounting portion has an opening connected to the fifth face. The first recessed portion has an opening connected to the fifth face.

According to the primary advantages of the present invention, the holder body is provided with the at least one first groove and the at least one second mounting portion for mounting the at least one first tool part so that the holder body is served as a handle to operate the at least one first tool part. Thus, the holder body is used to store the at least one first tool part and also used to provide multiple operational modes to the at least one first tool part.

According to another advantage of the present invention, the at least one first tool part is removably mounted on the at least one first groove or the at least one second mounting portion, so that the at least one first tool part is mounted on different positions of the holder body to provide various operational modes. In addition, the at least one first tool part is removed from the holder body and operated independently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
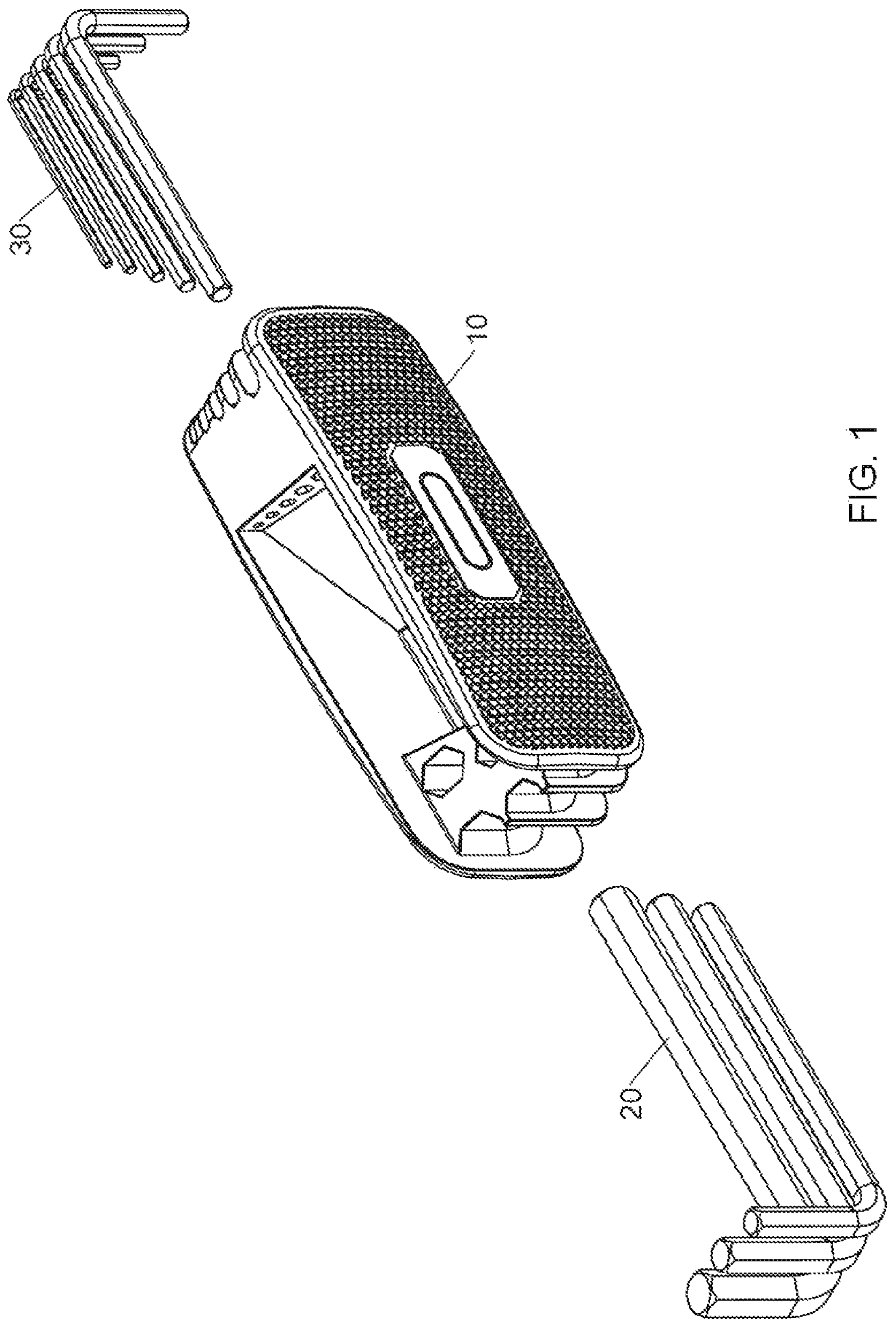
FIG. 1 is an exploded perspective view of a hand tool holder in accordance with the preferred embodiment of the present invention.
Figure 2:
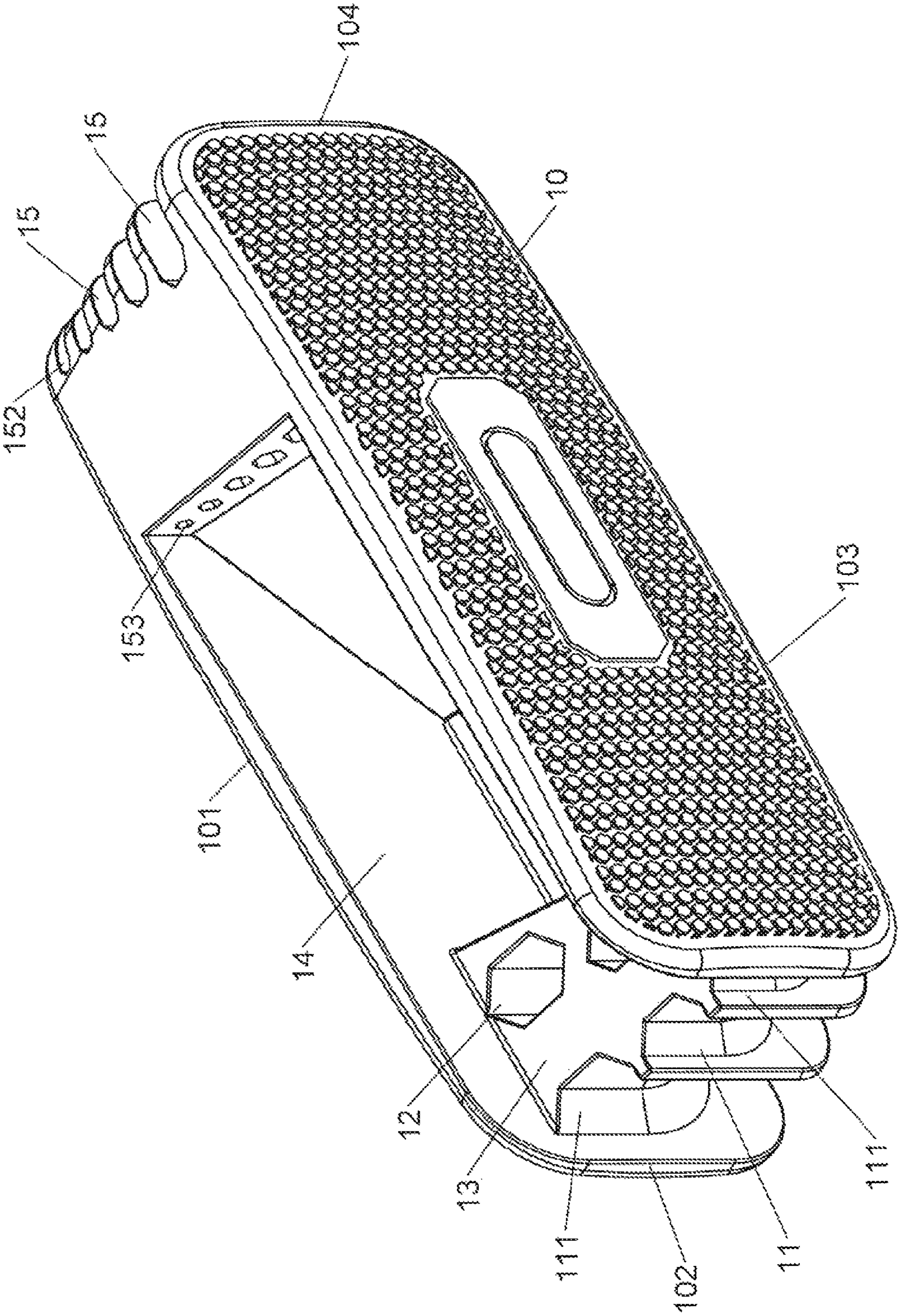
FIG. 2 is a perspective view of a holder body of the hand tool holder in accordance with the preferred embodiment of the present invention.
Figure 3:
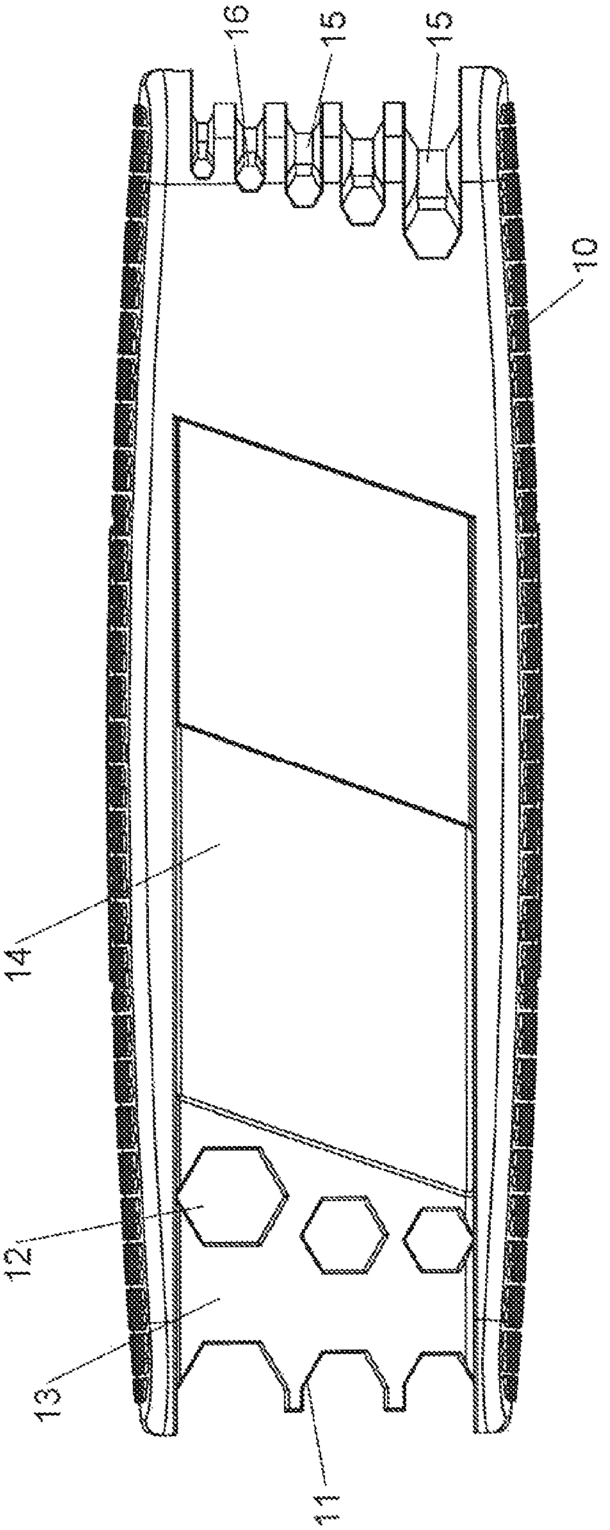
FIG. 3 is a top view of the holder body of the hand tool holder as shown in FIG. 2.
Figure 4:
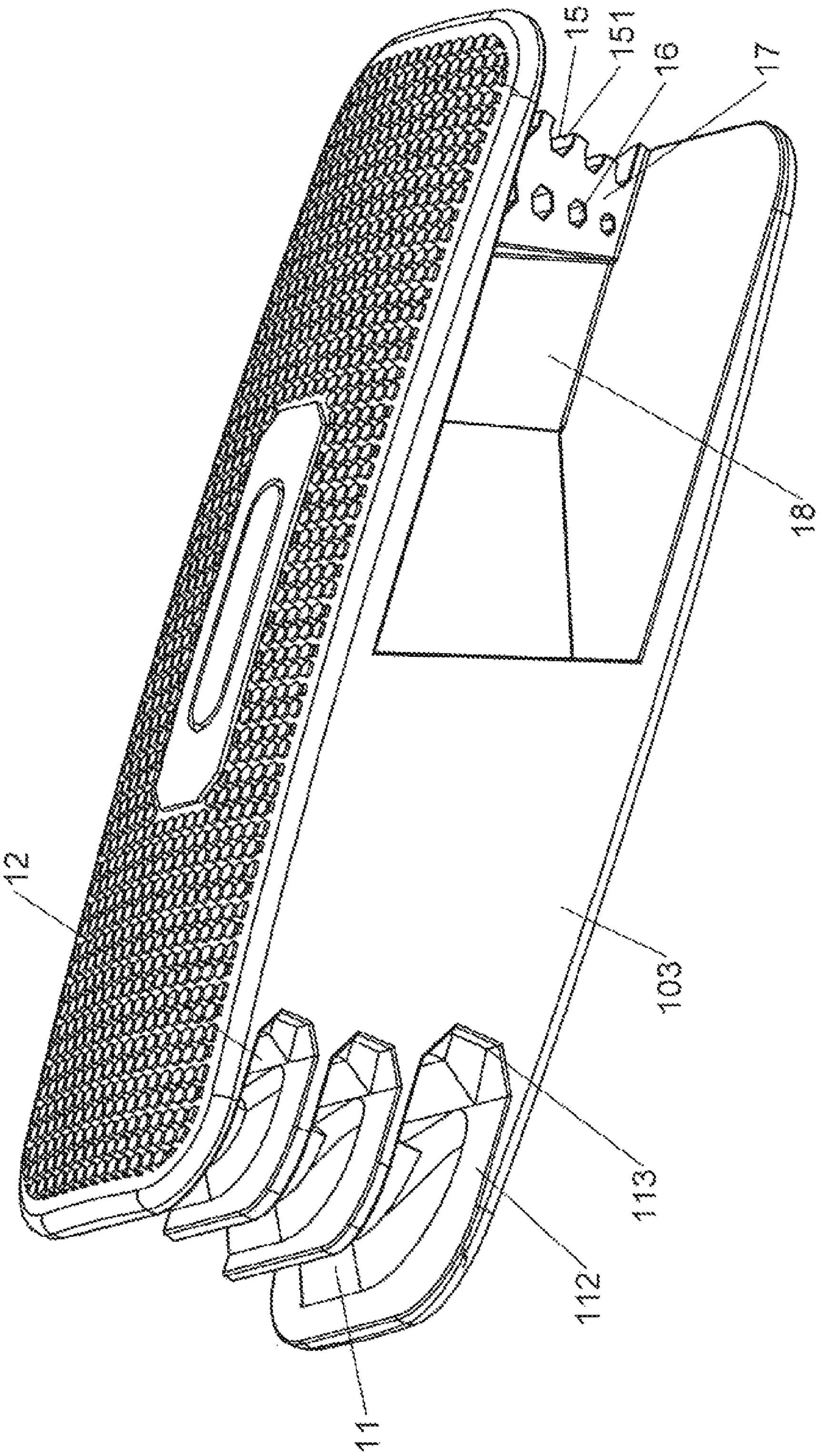
FIG. 4 is another perspective view of the holder body of the hand tool holder in accordance with the preferred embodiment of the present invention.
Figure 5:
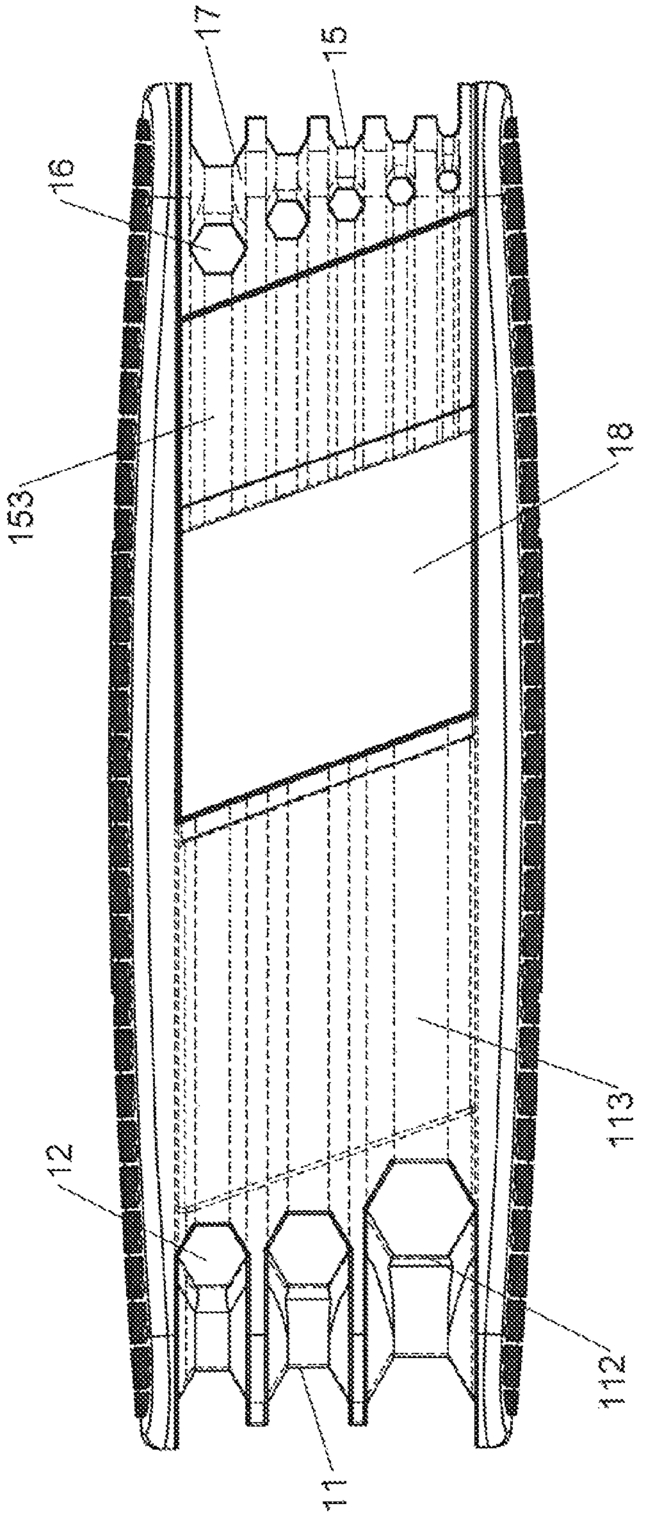
FIG. 5 is a bottom view of the holder body of the hand tool holder as shown in FIG. 2.

Referring to the drawings and initially to FIGS. 1-6, a hand tool holder in accordance with the preferred embodiment of the present invention comprises a holder body 10. The holder body 10 includes a first face 101, a second face 102, a third face 103, and a fourth face 104. Each of the first face 101 and the third face 103 is longer than the second face 102 and the fourth face 104.

The holder body 10 is provided with at least one first groove 11 arranged on the second face 102 and the third face 103. The at least one first groove 11 has an L-shaped profile. Preferably, the holder body 10 is provided with multiple first grooves 11 having different sizes. Optimally, the holder body 10 is provided with three first grooves 11. The at least one first groove 11 includes a first recessed portion 111, a first connecting portion 112, and a first mounting portion 113. The first recessed portion 111, the first connecting portion 112, and the first mounting portion 113 are connected and construct an L-shaped channel. The first recessed portion 111 is open at the second face 102. The first connecting portion 112 is open at the third face 103 and is located at a bent position of the at least one first groove 11. The first mounting portion 113 is closed at the third face 103 and is perpendicular to the first recessed portion 111. The first mounting portion 113 is a polygonal or hexagonal hole in cross-section.

The holder body 10 is provided with at least one second mounting portion 12 located beside the at least one first groove 11. The at least one second mounting portion 12 and the first recessed portion 111 extend in the same direction. The at least one second mounting portion 12 is connected to the first connecting portion 112 and has a specification equal to that of the first mounting portion 113. The at least one second mounting portion 12 is a polygonal or hexagonal hole penetrating the holder body 10 longitudinally. Preferably, the holder body 10 is provided with multiple second mounting portions 12 having different sizes. The second mounting portions 12 have a number equal to that of the first grooves 11. Optimally, the holder body 10 is provided with three second mounting portions 12. The holder body 10 is provided with a fifth face 13. The at least one second mounting portion 12 has an opening connected to the fifth face 13. The first recessed portion 111 has an opening connected to the fifth face 13. The fifth face 13 has a height different from and lower than that of the first face 101.

The holder body 10 is provided with a first space 14 having an opening connected to the first face 101. The first space 14 is an elongate slot with one open side. The first space 14 is used to store hand tool parts with smaller specifications, such as sockets or the like.

The holder body 10 is provided with at least one second groove 15 arranged on the first face 101 and the fourth face

104. The at least one second groove 15 has an L-shaped profile. Preferably, the holder body 10 is provided with multiple second grooves 15 having different sizes. Optimally, the holder body 10 is provided with five second grooves 15. The at least one second groove 15 includes a second recessed portion 151, a second connecting portion 152, and a third mounting portion 153. The second recessed portion 151, the second connecting portion 152, and the third mounting portion 153 are connected and construct an L-shaped channel. The second recessed portion 151 is open at the fourth face 104. The second connecting portion 152 is open at the first face 101 and is located at a bent position of the at least one second groove 15. The third mounting portion 153 is closed at the first face 101 and is perpendicular to the second recessed portion 151. The third mounting portion 153 is a polygonal or hexagonal hole in cross-section.

The holder body 10 is provided with at least one fourth mounting portion 16 located beside the at least one second groove 15. The at least one fourth mounting portion 16 and the second recessed portion 151 extend in the same direction. The at least one fourth mounting portion 16 is connected to the second connecting portion 152 and has a specification equal to that of the third mounting portion 153. The at least one fourth mounting portion 16 is a polygonal or hexagonal hole penetrating the holder body 10 longitudinally. Preferably, the holder body 10 is provided with multiple fourth mounting portions 16 having different sizes. The fourth mounting portions 16 have a number equal to that of the second groove 15. Optimally, the holder body 10 is provided with five fourth mounting portions 16. The holder body 10 is provided with a sixth face 17. The at least one fourth mounting portion 16 has an opening connected to the sixth face 17. The second recessed portion 151 has an opening connected to the sixth face 17. The sixth face 17 has a height different from and lower than that of the third face 103.

The holder body 10 is provided with a second space 18 having an opening connected to the third face 103.

The first mounting portion 113 is connected to the second space 18 and is a perforation penetrating the holder body 10. The third mounting portion 153 is connected to the first space 14 and is a perforation penetrating the holder body 10.

The hand tool holder further comprises at least one first tool part 20 including a hex wrench structure. The at least one first tool part 20 is received in the at least one first groove 11 or the at least one second mounting portion 12. The at least one first tool part 20 has a first end 21 and a second end 22. The first end 21 is received in the first recessed portion 111. The second end 22 is received in the first connecting portion 112 and the first mounting portion 113. The first end 21 partially protrudes from the first recessed portion 111 and partially protrudes from the fifth face 13. Preferably, the hand tool holder has multiple first tool parts 20 having different specifications.

After the at least one first tool part 20 is mounted in the at least one first groove 11, the second end 22 extends into the second space 18 and slightly closes or seals an opening of the second space 18.

The hand tool holder further comprises at least one second tool part 30. The at least one second tool part 30 is received in the at least one second groove 15 or the at least one fourth mounting portion 16. The at least one second tool part 30 has an end partially protruding from the second recessed portion 151 and partially protruding from the sixth face 17. Preferably, the hand tool holder has multiple second tool parts 30 having different specifications.

Figure 6:
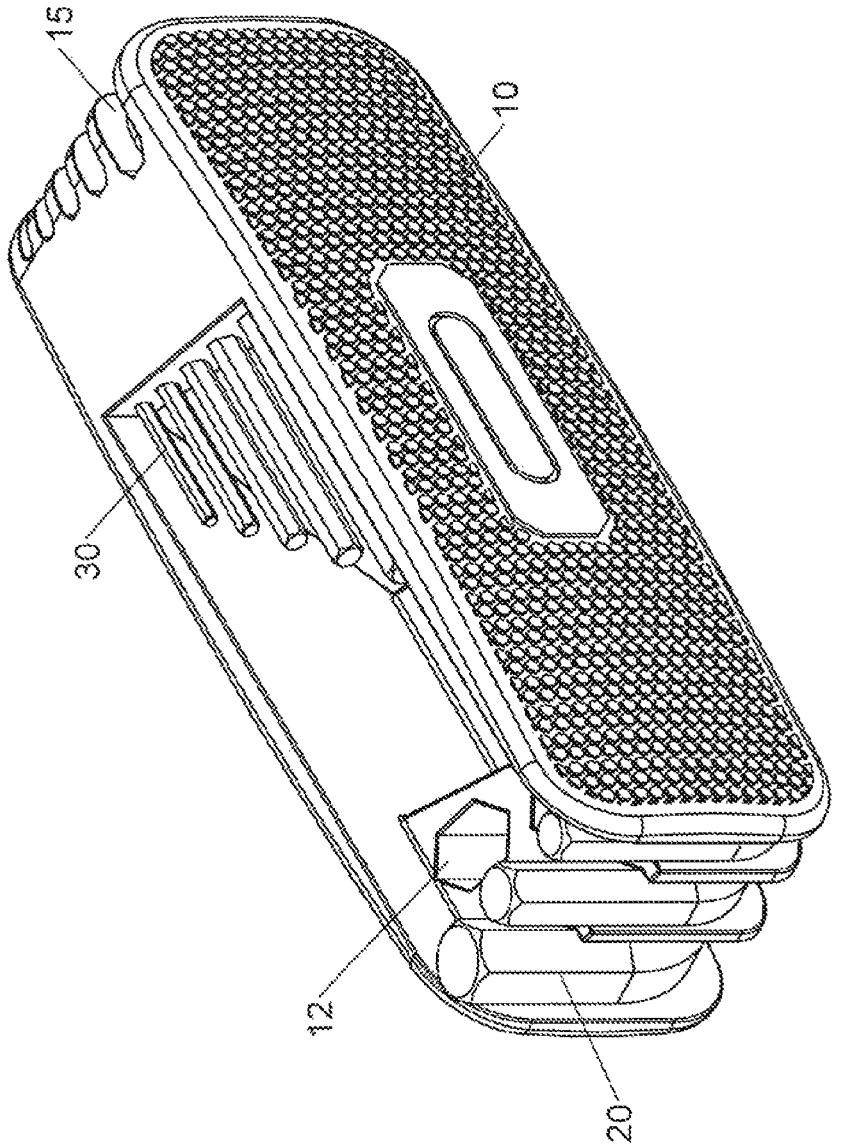
FIG. 6 is a perspective view of the hand tool holder in accordance with the preferred embodiment of the present invention.

As shown in FIG. 6, the at least one first tool part 20 is mounted in the at least one first groove 11, and the at least one second tool part 30 is mounted in the at least one second groove 15. Thus, the holder body 10 is used to hold the at least one first tool part 20 and the at least one second tool part 30, to facilitate the user storing and carrying the at least one first tool part 20 and the at least one second tool part 30.

Figure 7:
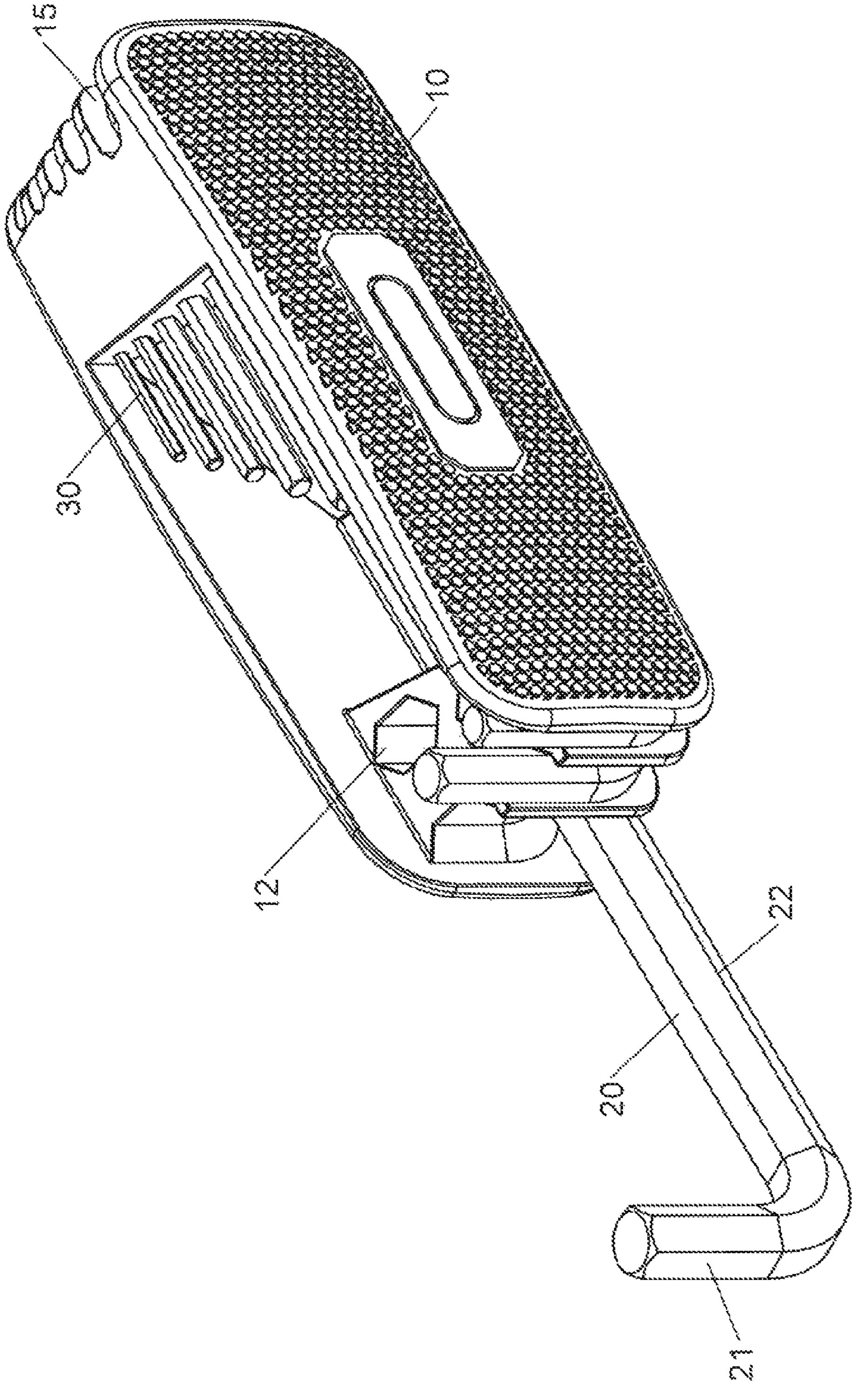
FIG. 7 is a perspective view showing a first operational state of the hand tool holder in accordance with the preferred embodiment of the present invention.

Referring to FIG. 7 with reference to FIGS. 1-6, the first end 21 partially protrudes from the first recessed portion 111. Thus, the first end 21 is pulled out by the user's finger from the fifth face 13, so that the second end 22 is pulled outward from the first mounting portion 113. In such a manner, the holder body 10 is held and driven by the user to rotate the at least one first tool part 20. Thus, the at least one first tool part 20 has a first operational mode.

Figure 8:
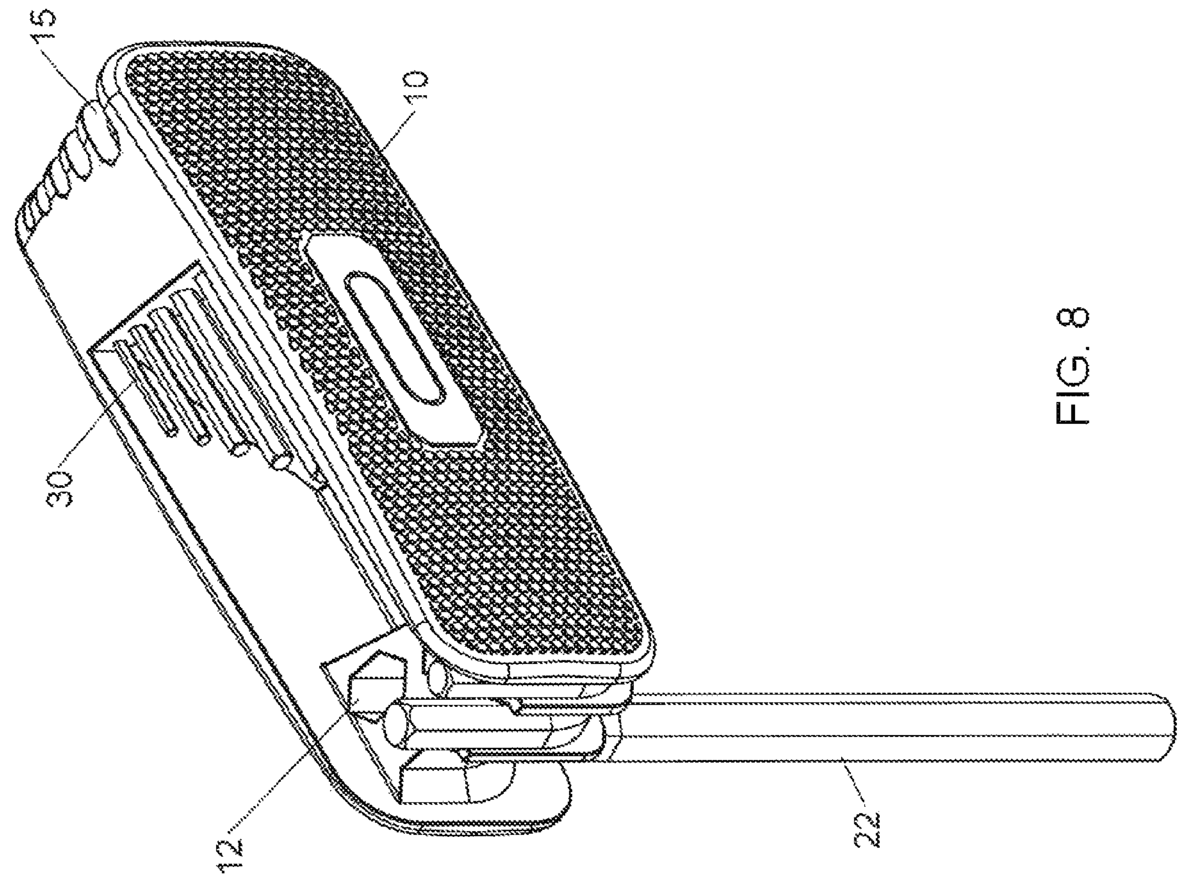
FIG. 8 is a perspective view showing a second operational state of the hand tool holder in accordance with the preferred embodiment of the present invention.

Referring to FIG. 8 with reference to FIGS. 1-6, the at least one first tool part 20 is pulled outward and detached from the at least one first groove 11. Then, the at least one first tool part 20 is turned, with the first end 21 being inserted into the first mounting portion 113, and with the second end 22 protruding from the at least one first groove 11. In such a manner, the holder body 10 is served as a handle to rotate the second end 22. Thus, the at least one first tool part 20 has a second operational mode.

Figure 9:
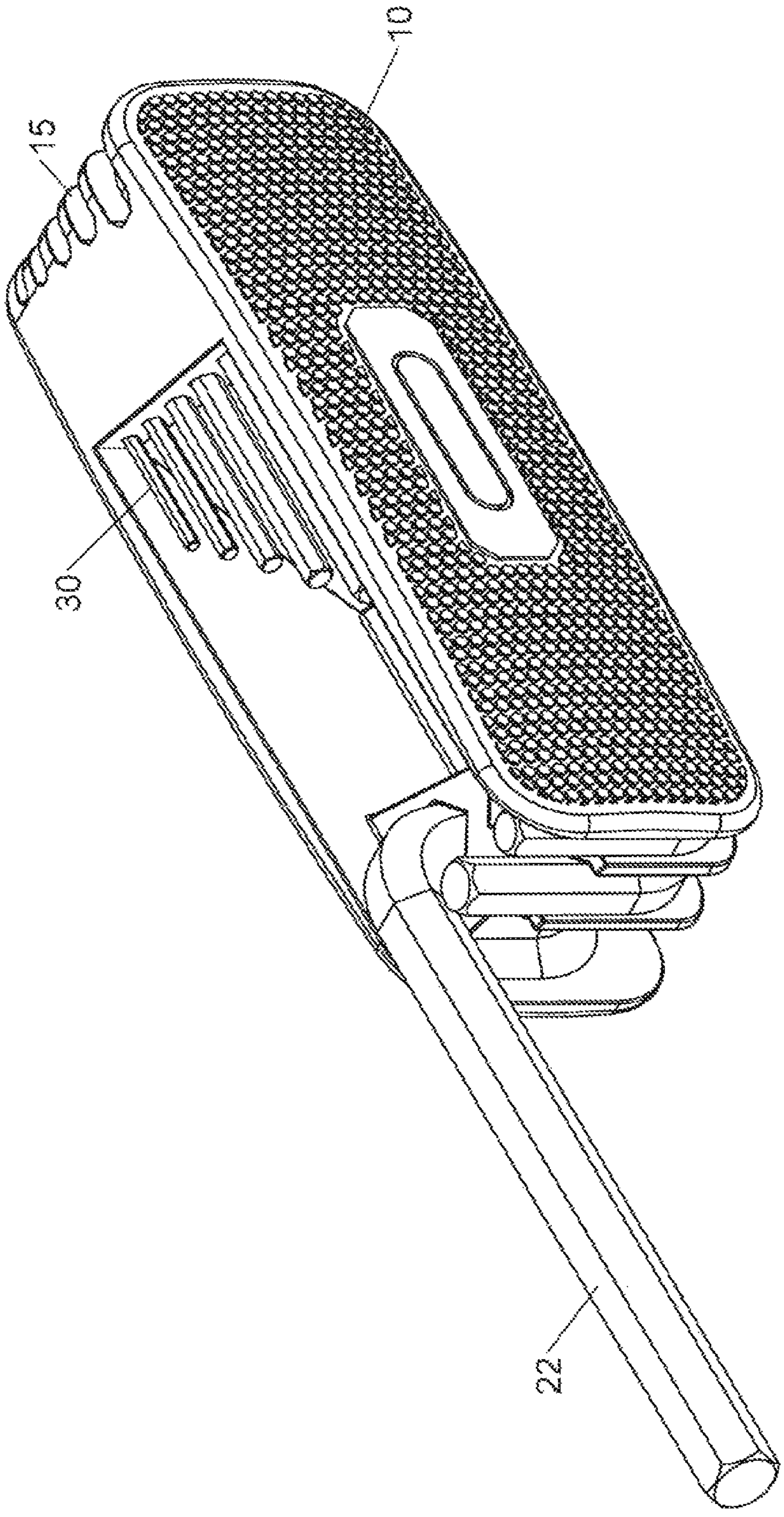
FIG. 9 is a perspective view showing a third operational state of the hand tool holder in accordance with the preferred embodiment of the present invention.

Referring to FIG. 9 with reference to FIGS. 1-6, the at least one first tool part 20 is pulled outward and detached from the at least one first groove 11. Then, the first end 21 is inserted into the at least one second mounting portion 12, and the second end 22 protrudes from the at least one second mounting portion 12. Thus, the at least one first tool part 20 has a third operational mode.

Figure 10:
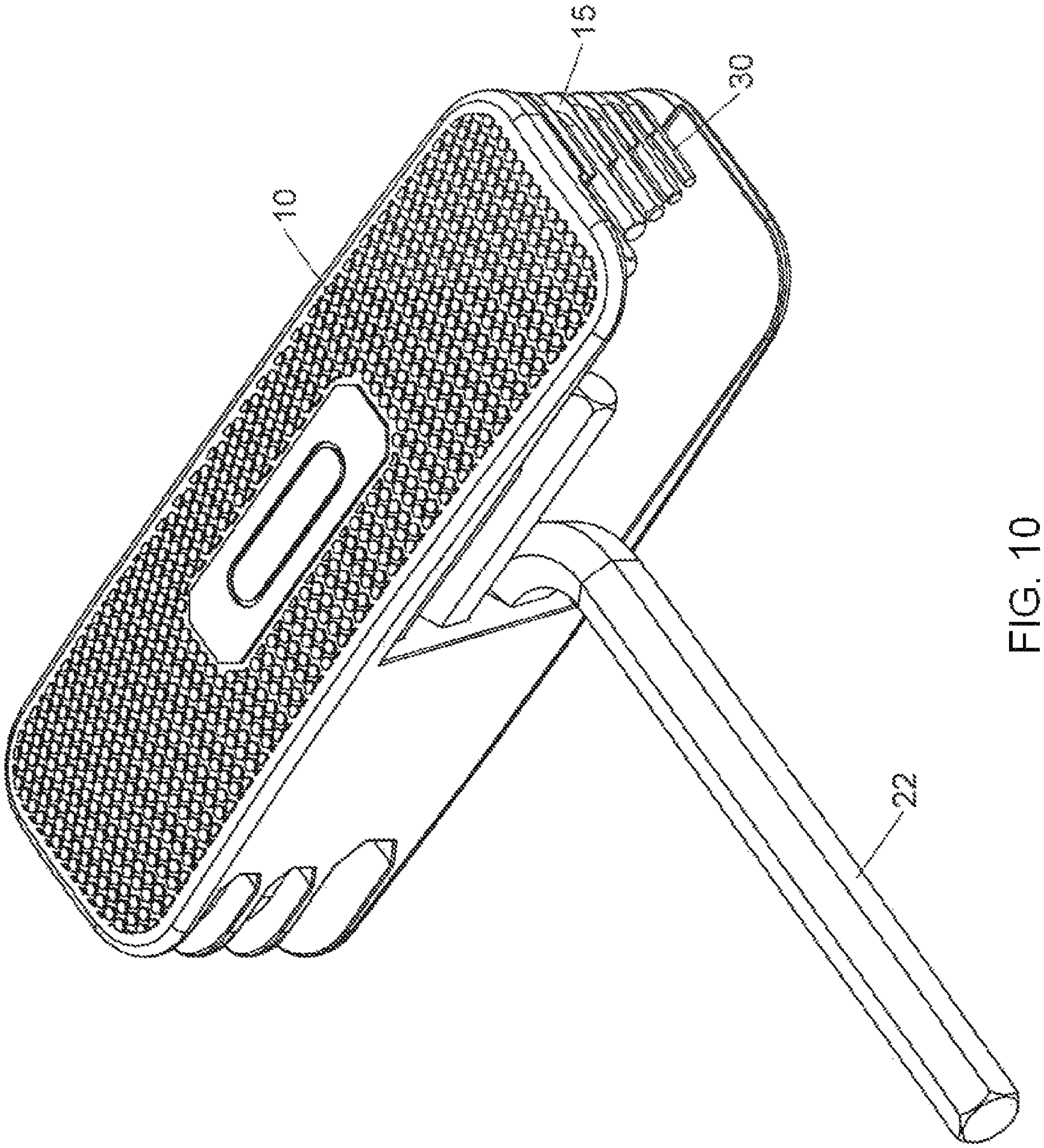
FIG. 10 is a perspective view showing a fourth operational state of the hand tool holder in accordance with the preferred embodiment of the present invention.

Referring to FIG. 10 with reference to FIGS. 1-6, the at least one first tool part 20 is pulled outward and detached from the at least one first groove 11. Then, the at least one first tool part 20 is placed into the second space 18, with the first end 21 being inserted into the first mounting portion 113, and with the second end 22 protruding from the second space 18. Thus, the at least one first tool part 20 has a fourth operational mode.

In conclusion, referring to FIGS. 7-10 with reference to FIGS. 1-6, the first end 21 or the second end 22 is inserted into and mounted in the first mounting portion 113 or the at least one second mounting portion 12. Each of the first mounting portion 113 and the at least one second mounting portion 12 is a perforation penetrating the holder body 10, so that the first end 21 or the second end 22 is inserted into the first mounting portion 113 or the at least one second mounting portion 12 in two different directions. Thus, the at least one first tool part 20 is mounted on the holder body 10 to perform various operational modes.

Similarly, the at least one second tool part 30 is mounted on the holder body 10 to perform various operational modes similar to that of the at least one first tool part 20.

Figure 11:
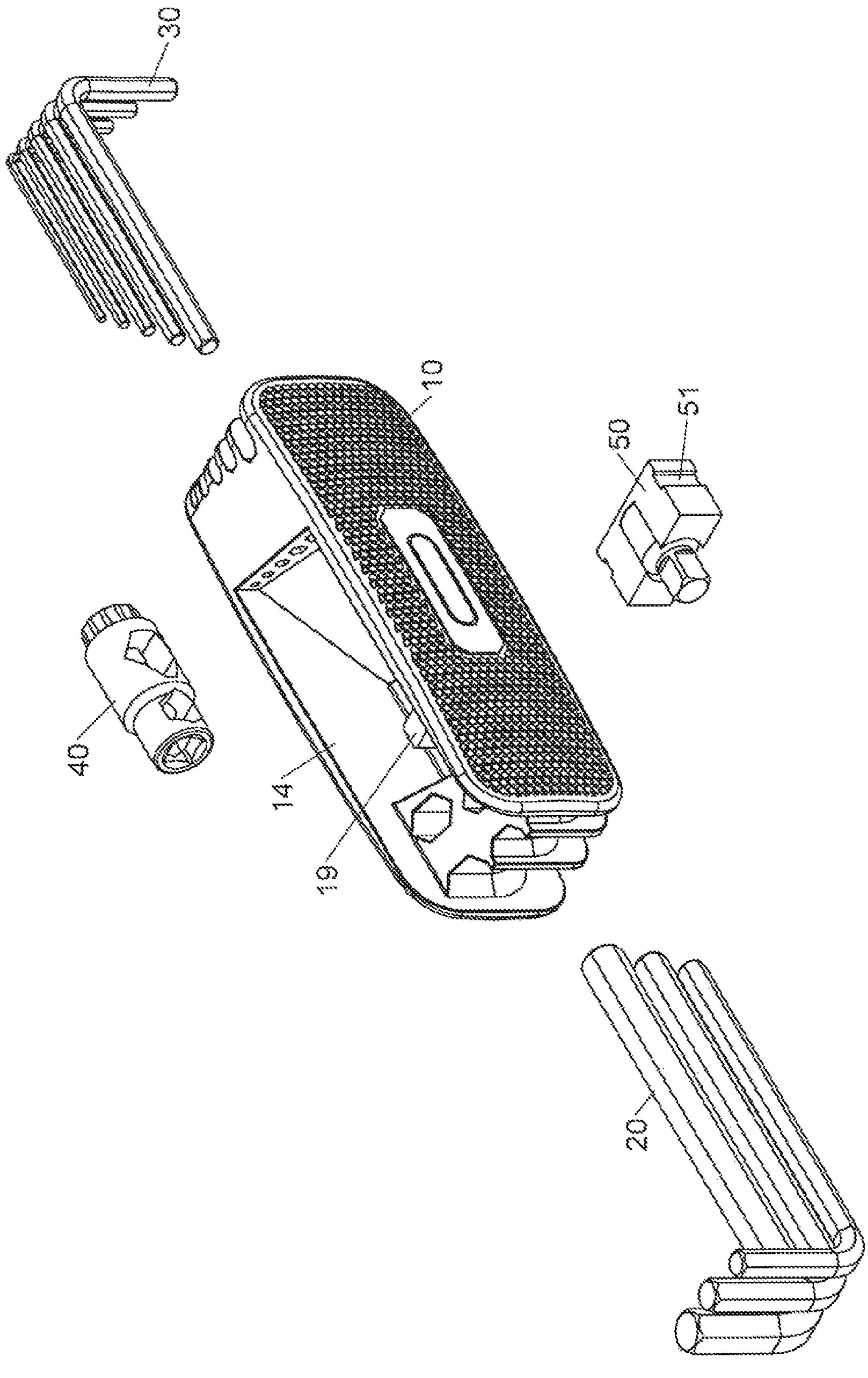
FIG. 11 is an exploded perspective view of a hand tool holder in accordance with the second preferred embodiment of the present invention.
Figure 12:
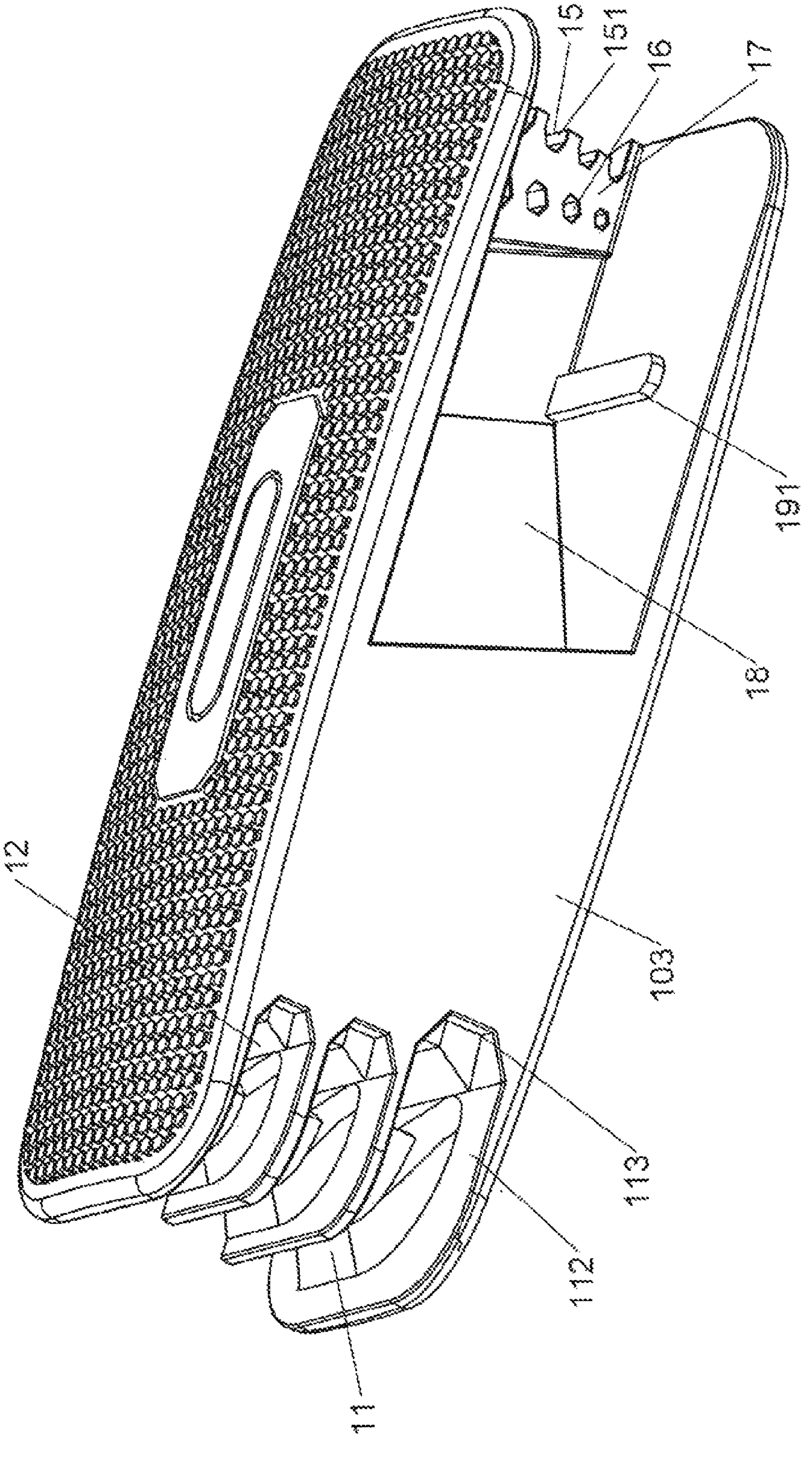
FIG. 12 is a perspective view of a holder body of the hand tool holder in accordance with the second preferred embodiment of the present invention.

Referring to FIGS. 11 and 12, the holder body 10 is provided with a fifth mounting portion 19 formed in the first space 14. The fifth mounting portion 19 is a square block. The hand tool holder further comprises a third tool part 40 received in the first space 14. After the third tool part 40 is removed from the first space 14, the third tool part 40 is mounted on the fifth mounting portion 19. The holder body 10 is provided with two first slideways 191 arranged on two sides of the second space 18. The hand tool holder further comprises a fourth tool part 50 provided with two second slideways 511 slidably mounted on the two first slideways 191 so that the fourth tool part 50 is received in the second space 18 or removed from the second space 18.

Figure 13:
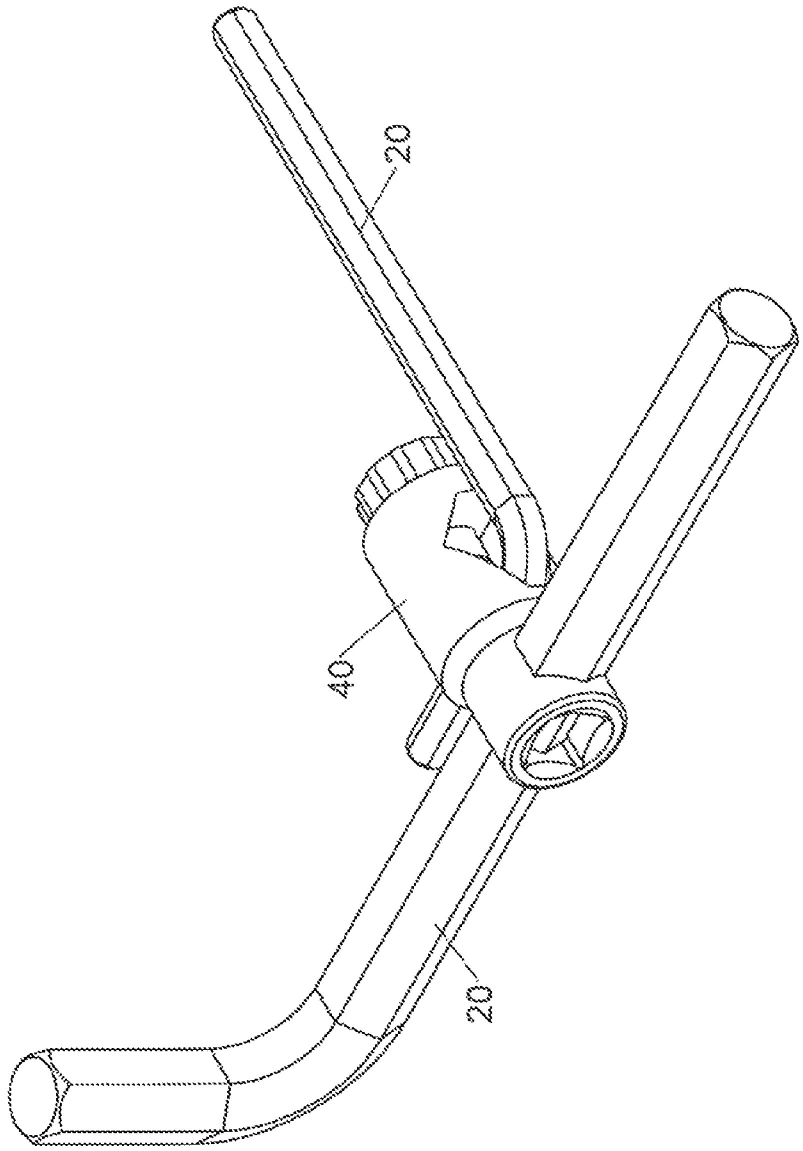
FIG. 13 is a perspective view showing an operation state of the hand tool holder in accordance with the second preferred embodiment of the present invention.

Referring to FIG. 13 with reference to FIG. 11, the first tool parts 20 (or the second tool parts 30) are removed from the holder body 10. Then, a first one of the first tool parts 20 (or the second tool parts 30) is inserted into one mounting recess of the third tool part 40, and a second one of the first tool parts 20 (or the second tool parts 30) is inserted into another mounting recess of the third tool part 40. Thus, the third tool part 40 is driven by the first one of the first tool parts 20 (or the second tool parts 30) to rotate the second one of the first tool parts 20 (or the second tool parts 30).

Figure 14:
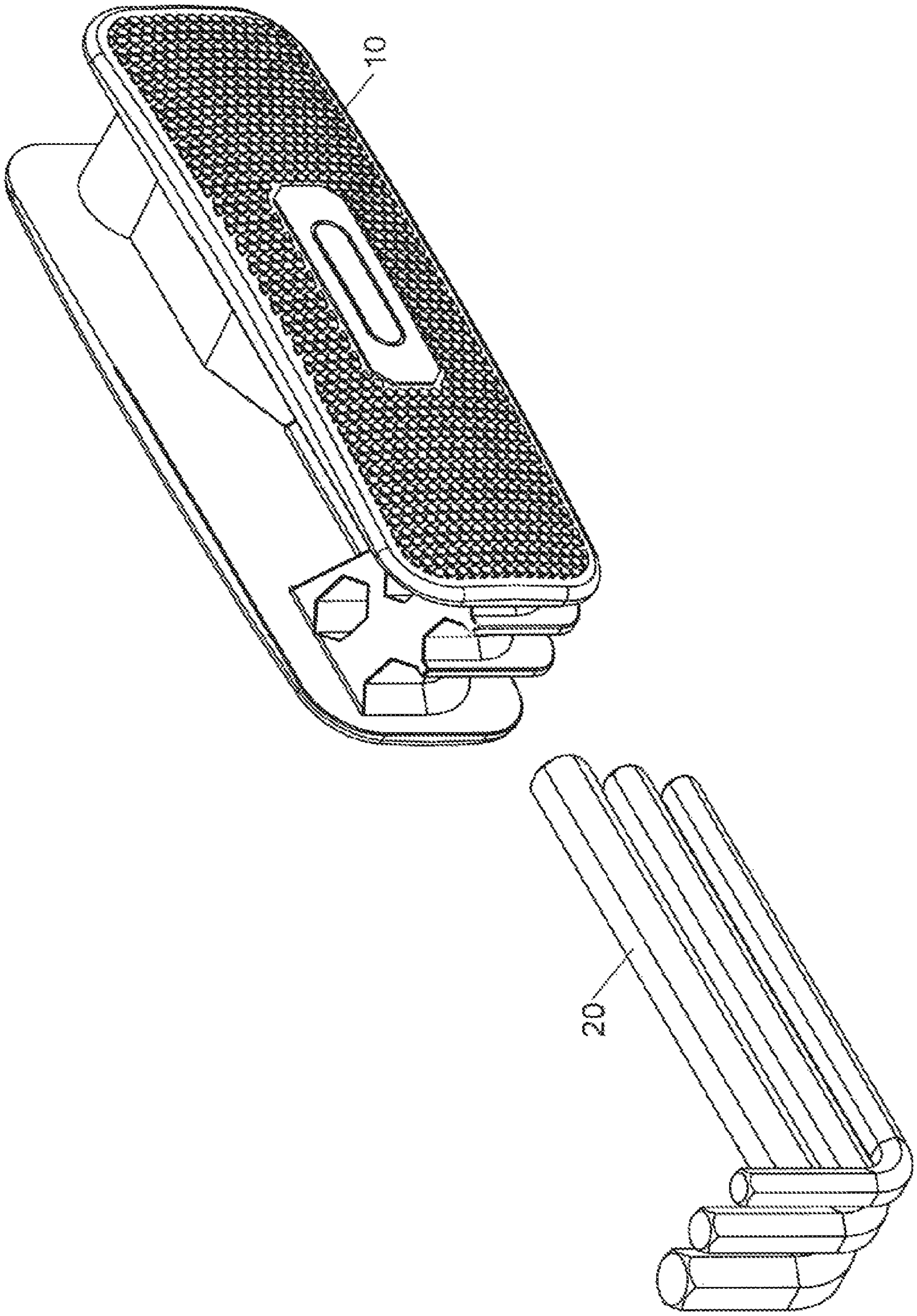
FIG. 14 is an exploded perspective view of a hand tool holder in accordance with the third preferred embodiment of the present invention.

Referring to FIG. 14 with reference to FIGS. 1-6, the at least one second groove 15, the at least one fourth mounting portion 16, and the sixth face 17 of the holder body 10 are undefined. In addition, the at least one second tool part 30 is undefined.

In another operational mode of the present invention, the at least one first tool part 20 and the at least one second tool part 30 are removed from the holder body 10. Thus, the at least one first tool part 20 and the at least one second tool part 30 are operated independently.

In another preferred embodiment of the present invention, the at least one first tool part 20 is an L-shaped shank received in the at least one first groove 11.

Accordingly, the hand tool holder of the present invention has the following advantages.

1. The holder body 10 is provided with the at least one first groove 11 and the at least one second mounting portion 12 for mounting the at least one first tool part 20 so that the holder body 10 is served as a handle to operate the at least one first tool part 20. Thus, the holder body 10 is used to store the at least one first tool part 20 and also used to provide multiple operational modes to the at least one first tool part 20.
2. The at least one first tool part 20 is removably mounted on the at least one first groove 11 or the at least one second mounting portion 12, so that the at least one first tool part 20 is mounted on different positions of the holder body 10 to provide various operational modes. In addition, the at least one first tool part 20 is removed from the holder body 10 and operated independently.
3. The first end 21 or the second end 22 is inserted into and mounted in the first mounting portion 113 or the at least one second mounting portion 12. Each of the first mounting portion 113 and the at least one second mounting portion 12 is a perforation penetrating the holder body 10, so that the first end 21 or the second end 22 is inserted into the first mounting portion 113 or the at least one second mounting portion 12 in two different directions. Thus, the at least one first tool part 20 is mounted on the holder body 10 to perform various operational modes.
4. The holder body 10 is provided with the at least one second groove 15 and the at least one fourth mounting portion 16 for mounting the at least one second tool part 30 so that the holder body 10 is served as a handle to operate the at least one second tool part 30. Thus, the holder body 10 is used to store the at least one second tool part 30 and also used to provide multiple operational modes to the at least one second tool part 30.
5. The at least one second tool part 30 is removably mounted on the at least one second groove 15 or the at least one fourth mounting portion 16, so that the at least one second tool part 30 is mounted on different positions of the holder body 10 to provide various operational modes. In addition, the at least one second tool part 30 is removed from the holder body 10 and operated independently.

6. The holder body 10 is used to store the at least one first tool part 20 and the at least one second tool part 30. The at least one first tool part 20 and the at least one second tool part 30 are respectively mounted on different positions of the holder body 10 to provide various operational modes. In addition, the at least one first tool part 20 and the at least one second tool part 30 are respectively removed from the holder body 10 and operated independently.
7. The at least one first tool part 20 and the at least one second tool part 30 are respectively mounted on the first mounting portion 113, the at least one second mounting portion 12, the third mounting portion 153, and the at least one fourth mounting portion 16 by a hexagonal engagement, so that the at least one first tool part 20 and the at least one second tool part 30 are operated steadily without slipping.
8. The holder body 10 is provided with the fifth mounting portion 19 and the two first slideways 191. The third tool part 40 is mounted on the fifth mounting portion 19 so that the third tool part 40 is received and stored in the first space 14. The fourth tool part 50 is provided with the two second slideways 511 slidably mounted on the two first slideways 191 so that the fourth tool part 50 is received and stored in the second space 18.
9. Referring to FIG. 13, the first tool parts 20 (or the second tool parts 30) are removed from the holder body 10 completely. Then, a first one of the first tool parts 20 (or the second tool parts 30) is assembled with the third tool part 40, and a second one of the first tool parts 20 (or the second tool parts 30) is assembled with the third tool part 40. Thus, the third tool part 40 is driven by the first one of the first tool parts 20 (or the second tool parts 30) to rotate the second one of the first tool parts 20 (or the second tool parts 30).

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A hand tool holder comprising:

a holder body;

wherein:

the holder body includes a first face, a second face, a third face, and a fourth face;

each of the first face and the third face is longer than the second face and the fourth face;

the holder body is provided with at least one first groove arranged on the second face and the third face;

the at least one first groove has an L-shaped profile;

the at least one first groove includes a first recessed portion, a first connecting portion, and a first mounting portion;

the first recessed portion, the first connecting portion, and the first mounting portion are connected and construct an L-shaped channel;

the first recessed portion is open at the second face;

the first connecting portion is open at the third face and is located at a bent position of the at least one first groove;

the first mounting portion is closed at the third face and is perpendicular to the first recessed portion;

the first mounting portion is a polygonal or hexagonal hole in cross-section;

the holder body is provided with at least one second mounting portion located beside the at least one first groove;

the at least one second mounting portion and the first recessed portion extend in the same direction;

the at least one second mounting portion is connected to the first connecting portion and has a size in cross-section equal to that of the first mounting portion;

the at least one second mounting portion is a polygonal or hexagonal hole in cross-section penetrating the holder body longitudinally;

the holder body is provided with a fifth face;

the at least one second mounting portion has an opening connected to the fifth face;

the first recessed portion has an opening connected to the fifth face;

the fifth face has a height different from and lower than that of the first face;

the holder body is provided with a first space having an opening connected to the first face;

the first space is an elongate slot with one open side;

the holder body is provided with at least one second groove arranged on the first face and the fourth face;

the at least one second groove has an L-shaped profile;

the at least one second groove includes a second recessed portion, a second connecting portion, and a third mounting portion;

the second recessed portion, the second connecting portion, and the third mounting portion are connected and construct an L-shaped channel;

the second recessed portion is open at the fourth face;

the second connecting portion is open at the first face and is located at a bent position of the at least one second groove;

the third mounting portion is closed at the first face and is perpendicular to the second recessed portion;

the third mounting portion is a polygonal or hexagonal hole in cross-section;

the holder body is provided with at least one fourth mounting portion located beside the at least one second groove;

the at least one fourth mounting portion and the second recessed portion extend in the same direction;

the at least one fourth mounting portion is connected to the second connecting portion and has a size in cross-section equal to that of the third mounting portion;

the at least one fourth mounting portion is a polygonal or hexagonal hole in cross-section penetrating the holder body longitudinally;

the holder body is provided with a sixth face;

the at least one fourth mounting portion has an opening connected to the sixth face;

the second recessed portion has an opening connected to the sixth face;

the sixth face has a height different from and lower than that of the third face;

the holder body is provided with a second space having an opening connected to the third face;

the first mounting portion is connected to the second space and is a perforation penetrating the holder body; and the third mounting portion is connected to the first space and is a perforation penetrating the holder body.

2. The hand tool holder as claimed in claim 1, wherein:

the holder body is provided with multiple first grooves having different sizes; and the holder body is provided with three first grooves.

3. The hand tool holder as claimed in claim 1, wherein:

the holder body is provided with multiple second mounting portions having different sizes;

the second mounting portions have a number equal to that of the first grooves; and the holder body is provided with three second mounting portions.

4. The hand tool holder as claimed in claim 1, wherein:

the holder body is provided with multiple second grooves having different sizes;

the holder body is provided with five second grooves;

the holder body is provided with multiple fourth mounting portions having different sizes;

the fourth mounting portions have a number equal to that of the second groove; and the holder body is provided with five fourth mounting portions.

5. The hand tool holder as claimed in claim 1, wherein:

the hand tool holder further comprises at least one first tool part including a hex wrench structure;

the at least one first tool part is received in the at least one first groove or the at least one second mounting portion;

the at least one first tool part has a first end and a second end;

the first end is received in the first recessed portion;

the second end is received in the first connecting portion and the first mounting portion;

the first end partially protrudes from the first recessed portion and partially protrudes from the fifth face; and the hand tool holder has multiple first tool parts having different specifications.

6. The hand tool holder as claimed in claim 5, wherein after the at least one first tool part is mounted in the at least one first groove, the second end extends into the second space and slightly closes an opening of the second space.

7. The hand tool holder as claimed in claim 5, further comprising:

at least one second tool part;

wherein:

the at least one second tool part is received in the at least one second groove or the at least one fourth mounting portion;

the at least one second tool part has an end partially protruding from the second recessed portion and partially protruding from the sixth face; and the hand tool holder has multiple second tool parts having different specifications.

8. The hand tool holder as claimed in claim 1, wherein:

the holder body is provided with a fifth mounting portion formed in the first space;

the fifth mounting portion is a square block;

the hand tool holder further comprises a third tool part received in the first space;

after the third tool part is removed from the first space, the third tool part is mounted on the fifth mounting portion;

the holder body is provided with two first slideways arranged on two sides of the second space; and the hand tool holder further comprises a fourth tool part provided with two second slideways slidably mounted on the two first slideways so that the fourth tool part is received in the second space or removed from the second space.

* * * * *